United States Patent
Sleight

(10) Patent No.: US 10,568,009 B2
(45) Date of Patent: Feb. 18, 2020

(54) VARIABLE PLAYBACK RATE OF STREAMING CONTENT FOR UNINTERRUPTED HANDOVER IN A COMMUNICATION SYSTEM

(71) Applicant: ViaSat, Inc., Carlsbad, CA (US)

(72) Inventor: Brian T. Sleight, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 23 days.

(21) Appl. No.: 15/210,685

(22) Filed: Jul. 14, 2016

(65) Prior Publication Data
US 2018/0020384 A1    Jan. 18, 2018

(51) Int. Cl.
| | |
|---|---|
| *H04W 36/02* | (2009.01) |
| *H04L 29/06* | (2006.01) |
| *H04W 36/00* | (2009.01) |
| *H04W 84/06* | (2009.01) |

(52) U.S. Cl.
CPC ....... *H04W 36/023* (2013.01); *H04L 65/4069* (2013.01); *H04L 65/604* (2013.01); *H04L 65/80* (2013.01); *H04W 36/0011* (2013.01); *H04W 84/06* (2013.01)

(58) Field of Classification Search
CPC .. H04W 36/023; H04L 65/1066; H04L 65/80; H04L 65/60
See application file for complete search history.

(56) References Cited

U.S. PATENT DOCUMENTS

| | | | |
|---|---|---|---|
| 5,835,104 A | 11/1998 | Hicok et al. | |
| 6,301,258 B1 | 10/2001 | Katseff et al. | |
| 6,442,385 B1 | 8/2002 | Marko | |
| 6,625,656 B2 | 9/2003 | Goldhor et al. | |
| 7,237,254 B1 | 6/2007 | Katseff et al. | |
| 7,536,469 B2 | 5/2009 | Chou et al. | |
| 7,594,025 B2 | 9/2009 | Colville et al. | |
| 7,707,614 B2 | 4/2010 | Krikorian et al. | |
| 8,185,611 B2 | 5/2012 | Price | |
| 8,370,887 B2 | 2/2013 | Virdi et al. | |
| 8,391,896 B2 | 3/2013 | Curcio et al. | |
| 8,917,207 B2 | 12/2014 | Frisco et al. | |
| 9,058,324 B2 | 6/2015 | Kohlenberg et al. | |
| 9,462,230 B1* | 10/2016 | Agrawal | H04N 7/155 |
| 2002/0170060 A1 | 11/2002 | Lyman | |
| 2003/0152093 A1* | 8/2003 | Gupta | H04J 3/0632 370/412 |
| 2006/0030311 A1 | 2/2006 | Cruz et al. | |

(Continued)

FOREIGN PATENT DOCUMENTS

| | | |
|---|---|---|
| EP | 2073486 A1 | 6/2009 |
| JP | 2004128658 A2 | 4/2004 |
| WO | 2014124753 A1 | 8/2014 |

OTHER PUBLICATIONS

"Predictive Buffering for Streaming Video in 3G Networks" Varun Singh et al. 978-1-4673-1239-4/12 $31.00 © 2012 IEEE.

(Continued)

*Primary Examiner* — Alex Skripnikov
*Assistant Examiner* — Sharmin Chowdhury
(74) *Attorney, Agent, or Firm* — Chang & Hale LLP

(57) ABSTRACT

Embodiments relate to systems and methods for modifying the playback rate of media data in order to improve craft-based media playback system performance during handover events in a communication system.

26 Claims, 8 Drawing Sheets

(56) References Cited

U.S. PATENT DOCUMENTS

| | | | |
|---|---|---|---|
| 2006/0251130 A1* | 11/2006 | Greer | G10L 21/04 370/508 |
| 2007/0204056 A1* | 8/2007 | Deshpande | H04N 21/44004 709/231 |
| 2009/0318139 A1 | 12/2009 | Su | |
| 2010/0121977 A1 | 5/2010 | Kontola et al. | |
| 2010/0223362 A1* | 9/2010 | Price | H04L 29/06027 709/219 |
| 2011/0047285 A1 | 2/2011 | Kampmann et al. | |
| 2011/0149906 A1 | 6/2011 | Hong et al. | |
| 2011/0202637 A1* | 8/2011 | Delahaye | H04N 7/17318 709/219 |
| 2012/0009890 A1* | 1/2012 | Curcio | H04L 29/06 455/230 |
| 2013/0308919 A1* | 11/2013 | Shaw | H04N 21/2221 386/239 |
| 2014/0095943 A1 | 4/2014 | Kohlenberg et al. | |
| 2014/0226560 A1 | 8/2014 | Parron et al. | |
| 2016/0286243 A1* | 9/2016 | Easterling | H04N 21/2146 |
| 2017/0063959 A1 | 3/2017 | Roncero Izquierdo et al. | |
| 2017/0353518 A1* | 12/2017 | McLeod | H04L 65/4084 |

OTHER PUBLICATIONS

"Geo-Predictive Real-Time Media Delivery in Mobile Environment" Curcio et al. ACM Digital Library http://dl.acm.org/citation.cfm?id=1878036 printed Aug. 5, 2015.

"Predictive Buffering for Streaming Video in 3G Networks," Varun Singh et al., IEEE, 978-1-4673-1239-4/12.

"Netflix of a Plane—Streaming Works at 30,000 Feet," John Porter and Lizzie Russo, Hacking Netflix, Jul. 13, 2010 http://www.hackingnetflix.com/2010/07/netflixstreamingworksonairplanes.html.

* cited by examiner

VARIABLE PLAYBACK RATE OF STREAMING CONTENT FOR UNINTERRUPTED HANDOVER IN A COMMUNICATION SYSTEM

BACKGROUND

Embodiments relate generally to communication systems, and, more particularly, to providing uninterrupted streaming media to media clients in a craft during communication system handover events.

Crafts may include storage-based media systems that store media content items on a server located on the craft; for example, on an aircraft, watercraft, train, automobile, or the like. Users on such a craft (e.g., passengers on an airplane) may access the stored media content items through media clients, such as handheld or seat-back media clients. Generally, such storage-based media systems are not affected by the craft moving between communication links while in transit because the media offered to users is stored locally on the craft. However, those same systems are limited to providing media already stored on the craft-based server before departure.

Crafts may also include systems that provide users with access to remote media sources, such as the Internet or other content sources via one or more wireless communication systems while in transit. However, movement between communication system coverage areas while in transit may negatively affect the ability to provide uninterrupted streaming of media content to users.

SUMMARY

In a first embodiment, a method for providing media content to a media client on a craft, comprises: initiating a first streaming media session with a remote content server using a first communication link; receiving linear media data associated with the first streaming media session at a first transmission rate over the first communication link; buffering the linear media data associated with the first streaming media session in a media buffer at a first buffer size; providing buffered linear media data associated with the first streaming media session from the media buffer for consumption on the media client at a first media playback rate; prior to an expected link transition initiation time, increasing buffering of the received linear media data in the media buffer from the first buffer size to a second buffer size by providing the buffered linear media data associated with the first streaming media session from the media buffer for consumption on the media client at a second media playback rate, the second media playback rate being lower than the first media playback rate; and providing, during a link transition time associated with the expected link transition initiation time, at least a portion of the buffered linear media data associated with the first streaming media session from the media buffer for consumption on the media client.

In some embodiments of the method, the method further comprises: initiating a second streaming media session with the remote content server using the second communication link; receiving linear media data associated with the second streaming media session at a second transmission rate; buffering the linear media data associated with the second streaming media session in the media buffer; and providing buffered linear media data associated with the second streaming media session from the media buffer at the first buffer size for consumption on the media client at the first media playback rate.

In some embodiments of the method, the method further comprises: prior to providing the buffered linear media data associated with the second streaming media session from the media buffer, providing the buffered linear media data associated with the second streaming media session from the media buffer for consumption on the media client at a third media playback rate, the third media playback rate being higher than the first media playback rate.

In some embodiments of the method, the method further comprises: determining the expected link transition initiation time between the first communication link and a second communication link.

In some embodiments of the method, the method further comprises: determining an expected link transition duration between the first communication link and the second communication link; and determining the second media playback rate based the expected link transition initiation time and the expected link transition duration.

In another embodiment, a system for providing media content to a media client on a craft, comprises: a memory comprising computer-executable code; a media buffer; a transceiver; at least one processor in data communication with the media buffer, the transceiver, and the memory, and configured to execute the computer-executable code and cause the system to: initiate a first streaming media session with a remote content server via the transceiver using a first communication link; receive, via the transceiver, linear media data associated with the first streaming media session at a first transmission rate over the first communication link; buffer the linear media data associated with the first streaming media session in the media buffer at a first buffer size; provide buffered linear media data associated with the first streaming media session from the media buffer for consumption on the media client at a first media playback rate; prior to an expected link transition initiation time, increase buffering of the received linear media data in the media buffer from the first buffer size to a second buffer size by providing the buffered linear media data associated with the first streaming media session from the media buffer for consumption on the media client at a second media playback rate, the second media playback rate being lower than the first media playback rate; and provide, during a link transition time associated with the expected link transition initiation time, at least a portion of the buffered linear media data associated with the first streaming media session from the media buffer for consumption on the media client.

In some embodiments of the system, the system is further configured to: initiate a second streaming media session with the remote content server via the transceiver using the second communication link; receive, via the transceiver, linear media data associated with the second streaming media session at a second transmission rate; buffer the linear media data associated with the second streaming media session in the media buffer at the first buffer size; and provide buffered linear media data associated with the second streaming media session from the media buffer at the first buffer size for consumption on the media client at the first media playback rate.

In some embodiments of the system, the system is further configured to: prior to providing the buffered linear media data associated with the second streaming media session from the media buffer, provide the buffered linear media data associated with the second streaming media session from the media buffer for consumption on the media client at a third media playback rate, the third media playback rate being higher than the first media playback rate.

In some embodiments of the system, the system is further configured to: determine the expected link transition initiation time between the first communication link and a second communication link.

In some embodiments of the system, the system is further configured to: determine an expected link transition duration between the first communication link and the second communication link; and determine the second media playback rate based on a current time, the expected link transition initiation time, and the expected link transition duration.

In some embodiments of the method and system, the second media playback rate is at less than or equal to 10% lower than the first media playback rate.

In some embodiments of the method and system, the second media playback rate is configured so that the media buffer will not be depleted during the link transition time.

In some embodiments of the method and system, the first communication link is a first satellite communication link.

In some embodiments of the method and system, the second communication link is a second satellite communication link.

In some embodiments of the method and system, the second communication link is an air-to-ground communication link.

BRIEF DESCRIPTION OF THE DRAWINGS

The present disclosure is described in conjunction with the appended figures.

Figure 1:
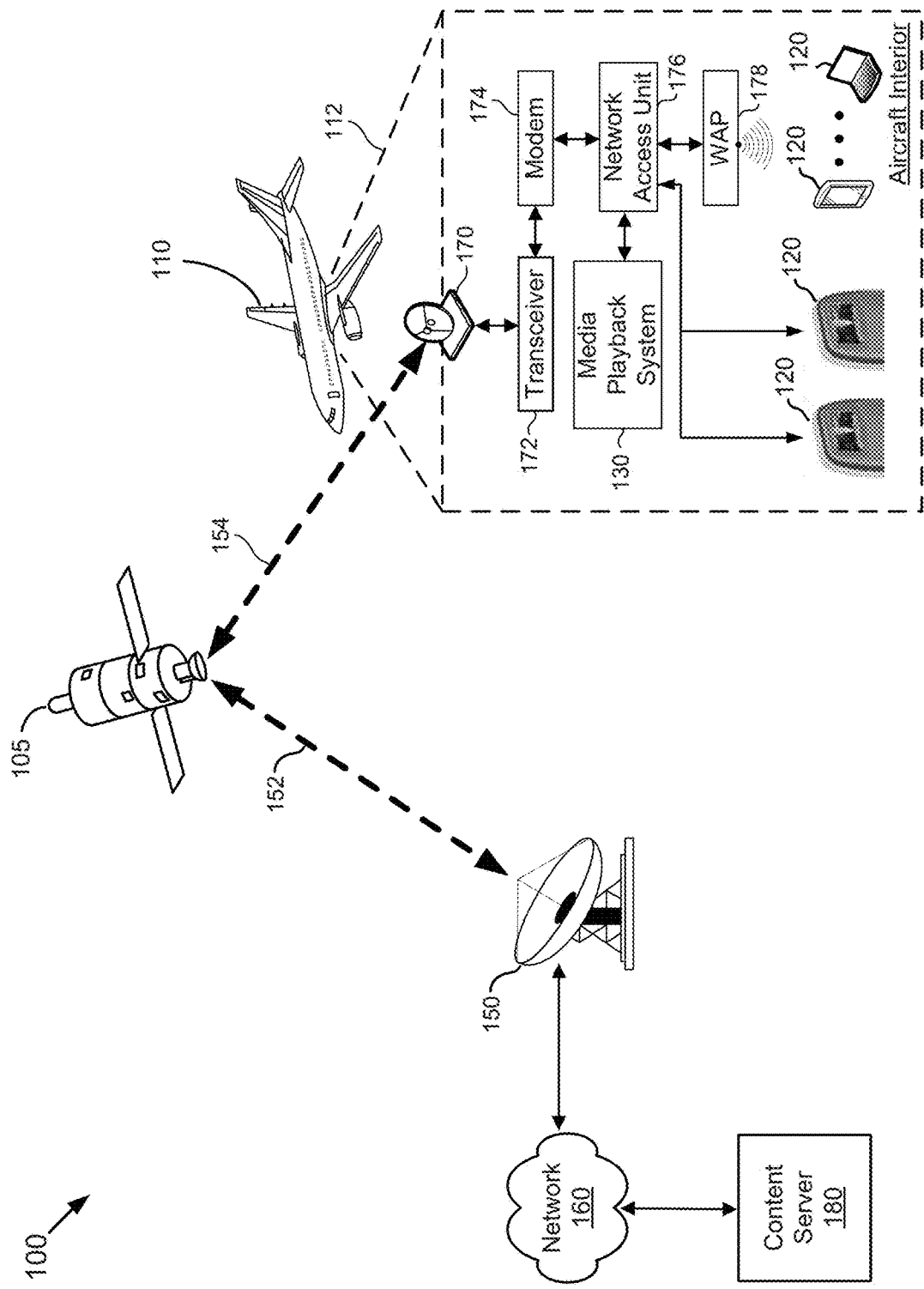
FIG. 1 shows a simplified diagram of a satellite communication system.

In the aforementioned figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

Systems and methods are described herein for providing uninterrupted consumption of streaming linear media content by media clients on the craft during the handover between communication links. As described in more detail below, the systems and methods described herein utilize variable playback rates of the linear media content to gradually build-up a buffer on the craft in anticipation of handover, such that the buffer can be used to provide media content to the media clients during the time it takes to perform the handover. In doing so, the handover can be transparent to the users, as consumption of the linear media content is not interrupted or otherwise impacted during the handover. As used herein, linear media content generally refers to any stream of content that is scheduled for delivery at a certain time (e.g. a television show run at a set time, a live event, etc.). Thus, when a user decides to select, for example, a "channel" carrying linear media content, the user effectively elects to consume whatever scheduled media is playing on that channel at that time; as opposed to directly selecting the media content itself.

A two-way communication system in a craft may facilitate communication via a communication link (e.g., a satellite communication link) in order to provide access to sources accessible via remote networks such as the Internet, such as providing access to media content (e.g., streaming media content) to media clients associated with or otherwise in data communication with an in-transit media system. As the craft moves from place to place, it may need to move from one communication link to another communication link, for example when the craft reaches the extent of the coverage area of its current communication link. Moving between communication links involves handing over communication service of the craft from one communication link to another communication link. In some cases, those communication links may be within the same access network (e.g., moving between spot beams in the same satellite) while in other cases those communication links may be within different access networks (e.g., between two different satellite networks). During the time it takes (referred to herein as a "link transition time") to perform such a handover, communication service with the craft is interrupted such that streaming media content from a remote source is temporarily unavailable to media clients on the craft. While the media clients may include a local storage that nominally buffers received data sufficient to handle short-term network variations, the nominal buffer may not be large enough to permit uninterrupted consumption by the user during a transition from one communication link to another communication link.

FIG. 1 depicts a simplified diagram of an example satellite communication system 100. Many other configurations are possible having more or fewer components than the satellite communication system 100 of FIG. 1. The satellite communication system 100 of FIG. 1 includes craft 110 in data communication with remote content server 180 via communication link 154, satellite 105, communication link 152, and ground terminal 150. As depicted in FIG. 1, media can be obtained from remote content server 180 via ground terminal 150 (and/or other terrestrial stations, gateways, or other network nodes).

While a single craft 110 (in this example, an airplane) is shown in communication via a single satellite 105 in FIG. 1, the techniques described herein can be applied in many other communication environments. For example, crafts capable of participating in the communication system shown in FIG. 1 may include: aircraft (e.g., airplanes, helicopters, blimps, balloons, etc.), trains, automobiles (e.g., cars, trucks, busses, etc.), watercraft (e.g., private boats, commercial shipping vessels, cruise ships, etc.), etc. Any or all such crafts may communicate via any one or more suitable communication system(s), including any suitable communication links, such as: a satellite communication system, an air-to-ground communication system, a hybrid satellite and air-to-ground communication system, a cellular communication systems, and others. Because of the mobile nature of craft 110, the communication system will likely involve at least one wireless communication link, such as the aforementioned examples.

Ground terminal 150 may enable bidirectional communication with satellite 105. In some embodiments, ground terminal 150 may be known as a terrestrial station or a gateway. Ground terminal 150 is in data communication with network 160 and thereby to content server 180.

Craft 110 may include two-way communication system 112 to facilitate bidirectional communication with remote entities via satellite 105. In the example depicted in FIG. 1, two-way communication system 112 includes antenna system 170, transceiver 172, modem 174, network access unit 176, wireless access point (WAP) 178, and a media playback system 130. Two-way communication system 112 may receive a forward downlink signal from satellite 105 and transmit a return uplink signal to the satellite 105 via communication link 154.

Media clients 120 may include, for example, mobile devices such as personal electronic devices (e.g., smartphones, laptops, tablets, netbooks, and the like) brought onto craft 110 by passengers. As further examples, media clients 120 can also include fixed or on-craft devices, such as passenger seat-back systems or other devices on the craft 110. The media clients 120 may execute one or more applications that allow users on the craft 110 an interface for communicating with the remote content server 180 to obtain and consume media content in a streaming (or progressively downloaded manner) via the satellite 105, ground terminal 150, and two way communication system 112. The users of the media clients 120 may for example be subscribers of a streaming media service provided by the remote content server 180. As another example, the remote content server 180 may not require a subscription to access the media content. As yet another example, the subscription to the remote content server 180 may be associated with the operator of the craft 110 and/or the operator of the communication system 100. Media clients 120 may communicate with the network access unit 176 via a link that can be wired and/or wireless (e.g., via wireless access point (WAP) 178). The link can be, for example, part of a local area network such as a wireless local area network (WLAN) supported by wireless access point (WAP) 178. One or more wireless access points 178 may be distributed about the craft 110 and may, in conjunction with network access unit 176, provide traffic switching and routing functionality.

Network access unit 176 may provide uplink data received from media clients 120 to modem 174 to generate modulated uplink data (e.g., a transmit intermediate frequency (IF) signal) for delivery to transceiver 172. Transceiver 172 may then up-convert and amplify the modulated uplink data to generate a return uplink signal of the communication link 154 for transmission to satellite 105 via antenna system 170. Similarly, transceiver 172 may receive the forward downlink signal of the communication link 154 from satellite 105 via antenna system 170. Transceiver 172 may also amplify and down-convert the forward downlink signal to generate modulated downlink data (e.g., a receive IF signal) for demodulation by the modem 174. The demodulated downlink data from modem 174 may be provided to network access unit 176 for routing to media clients 120. In some embodiments, modem 174 is integrated with network access unit 176, while in others, modem 174 is a separate component.

As described in more detail below, media playback system 130 can provide commands to network access unit 176 to manage and distribute media offerings from remote content server 180 to media clients 120 on craft 110. For example, media playback system 130 can provide for onboard media distribution and can include one or more media servers, media storage devices, etc. The functions of media playback system 130 can be implemented in hardware, instructions embodied in memory and formatted to be executed by one or more general or application-specific processors, firmware, or any combination thereof. In the example depicted in FIG. 1, media playback system 130 is shown as a separate device. Alternatively, some or all of the components or features of media playback system 130 may be implemented within one or more other components of two-way communication system 112. Network access unit 176 may also enable media clients 120 to access one or more additional servers (not shown) located in craft 110, such as a server storing in-flight entertainment media.

Network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, a cellular network, and/or any other type of network supporting communication as described herein. Further, network 160 can include both wired (e.g., copper and optical) and wireless (e.g., radio and microwave) connections.

Remote content server 180 may provide various types of media content, such as linear media content (e.g., linear audio and/or video media). Linear media content generally refers to any stream of content that is scheduled for delivery at a certain time (e.g. a television show run at a set time, a live event, etc.). Thus, when a user decides to select, for example, a "channel" carrying linear media content, the user effectively elects to consume whatever scheduled media is playing on that channel at that time; as opposed to directly selecting the media content itself. For example, a user may select to watch a televised broadcast provided to the media playback system 130 from the remote content server 180.

Remote content server 180 may also provide non-linear programming (e.g., video on demand), which may be available on-demand to media clients 120. Both linear and non-linear media content can be communicated from remote content server 180 to media clients 120 (e.g., in response to requests for such media from the media clients 120), while in flight, via satellite 105 and media playback system 130. Although only one remote content server 180 is depicted in FIG. 1 for simplicity, media clients 120 may receive content from one or more remote content servers 180. For example, multiple network television providers may provide media content, such as linear media content, from multiple remote content servers 180.

Figure 2:
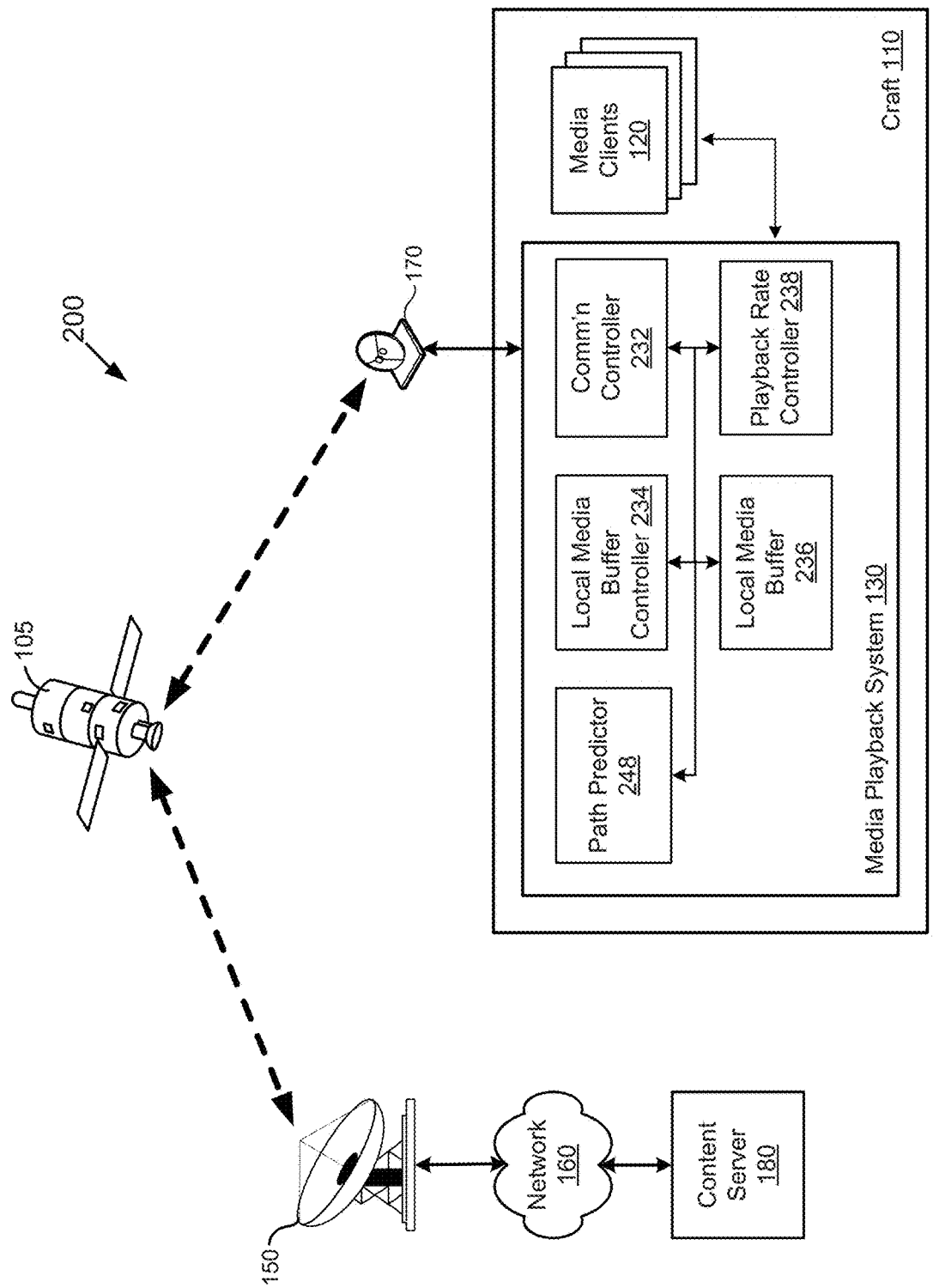
FIG. 2 shows a simplified diagram of aspects of a media delivery system.

FIG. 2 depicts a block diagram of an illustrative media delivery system 200 according to various embodiments. Many other configurations are possible having more or fewer components. Moreover, the functionalities described herein can be distributed among the components in a different manner than described herein. Embodiments of the media delivery system 200 may implemented using components of the communication system described with reference to FIG. 1. However, in FIG. 2 and the following discussion, some components (e.g., antenna system 170, transceiver 172, modem 174, network access unit 176, and WAP 178) of the two-way communication system 112 discussed above with respect to FIG. 1 are omitted for clarity.

As depicted in FIG. 2, a media playback system 130 in craft 110 is in communication, via satellite 105 (or other suitable communication network, as described above) with a remote content server 180. Media playback system 130 is also is in communication with multiple media clients 120 in craft 110. As used herein, describing media playback system 130 and/or media clients 120 as "in" craft 110 is intended broadly to include any suitable location of those components, so that the components move along with craft 110. For example, a particular one or more media playback systems 130 or media clients 120 could, alternatively, be located in, on, coupled with, integrated into, and/or otherwise disposed in relation to craft 110. Further, the functions of media playback system 130 can be implemented in hardware, instructions embodied in a memory and formatted to be executed by one or more general or application-specific processors, firmware, or any combination thereof.

Embodiments of media playback system 130 may include a craft-side communication controller 232, a local media buffer controller 234, a local media buffer 236, and a playback rate controller 238.

The craft-side communication controller 232 facilitates communication via the network access unit (not shown) to enable uninterrupted streaming of linear media content provided by the content server 180 to the client devices using the techniques described herein. The craft-side communication controller 232 may offer linear media content that is available from the remote content server 180 for selection by users of the media clients 120. The craft-side communication controller 232 may then receive requests for linear media content from the media clients and initiate streaming sessions of the requested linear media content with the remote content server 180 on behalf of the media clients 120.

Local media buffer controller 234 may receive data from the communication controller 232, such as streaming media data, and direct the received data to a local data storage, such as local media buffer 236. Local media buffer controller 234 may also direct local media buffer 236 to provide media data to one or more media clients 120 in craft 110 by way of playback rate controller 238. Further, media buffer controller 234 may monitor the status of media buffer 236 with respect to one or more media streams. For example, media buffer controller 234 mat monitor the amount of data stored in local media buffer 236 for the one or more media streams. The amount of data stored may be expressed, for example, in data units (e.g., megabytes) or in terms of time units (e.g., minutes).

Local media buffer 236 may comprise a memory for storing media data on craft 110. For example, local media buffer may comprise one or more hard disk drives, solid state drives, random access memory modules, or the like. In the illustrated embodiment, the local media buffer 234 is a part of a media playback system 130. In some alternative embodiments, the local media buffer 234 may be storage on one or more media clients 120. In yet other alternative embodiments, the local media buffer 234 may be distributed between the media playback system 130 and the media clients 120.

Playback rate controller 238 may set, alter, modulate or otherwise affect the playback rate of media data being consumed by media clients 120. For example, the playback rate controller 128 may alter the rate at which media data is retrieved from the local media buffer 236 and provided to the media clients 120 for consumption. In such a case, the playback rate controller 238 may speed up the playback rate of media data (e.g., provide the media data at a higher frame rate to media clients 120) or slow down the playback rate of media data (e.g., provide the media data at a lower frame rate to media clients 120). As another example, the playback rate controller 238 may provide commands to a media playback application executing on the media clients 120 indicating the rate at which the media playback application should output the linear media data for consumption by users. As described in more detail below, the playback rate controller 238 may receive information from the path predictor 248 regarding upcoming expected transitions between a first communication link and a second communication link. Based on the expected transition, playback rate controller 238 may speed up or slow down playback to media clients 120 in order to manage the amount of buffered media data in local media buffer 236. In other embodiments, playback rate controller 238 may be in data communication with local media buffer controller 234 and/or local media buffer 236 and may adjust playback rate of media data at media clients 120 based on the status of local media buffer 236. For example, play back rate controller 238 may reduce the playback rate of media data to media clients 120 if local media buffer 236 crosses below a threshold level of buffered media data, or if local media buffer controller 234 indicates a reduced rate of media data received via communication controller 232.

Media playback system 130 may include the path predictor 248, which may predict some or all of a path for a craft, such as craft 110, based on, for example, origin and destination (e.g., city pair), current or planned trajectory, flight schedules, flight plans, flight trends, and other ways. Media playback system 130 may use path predictor 248 in order to determine when a craft is predicted to be within one or more communication coverage areas. For example, path predictor 248 may determine based on a craft's current heading and speed that a craft will be in a first communication coverage area for a period of time followed by a second communication coverage area for another period of time. In this way, path predictor 248 may also be able to determine when a communications transition is expected to occur. The path predictor 248 is depicted in FIG. 2 as part of media playback system 130 in the illustrated embodiments. In some alternative embodiments, the path predictor 248 may be a part of a ground system, such as ground terminal 150. In some embodiments, path prediction for craft 110 may be performed by ground terminal 150 and media playback system 130 or craft 110 collectively. For example, craft 110 may include equipment that provides positional information such as a global positioning system (GPS) and an internal reference unit (IRU) that provide current location, heading, and speed information to path predictor 248. The path predictor 248 may also store (or otherwise obtain) data indicating the coverage areas of various communication links available for use in communicating with the craft 110. The path predictor 248 can then use the positional information of the craft 110 and the coverage areas of the various communication links determine when expected communication transitions may occur.

Figure 3:
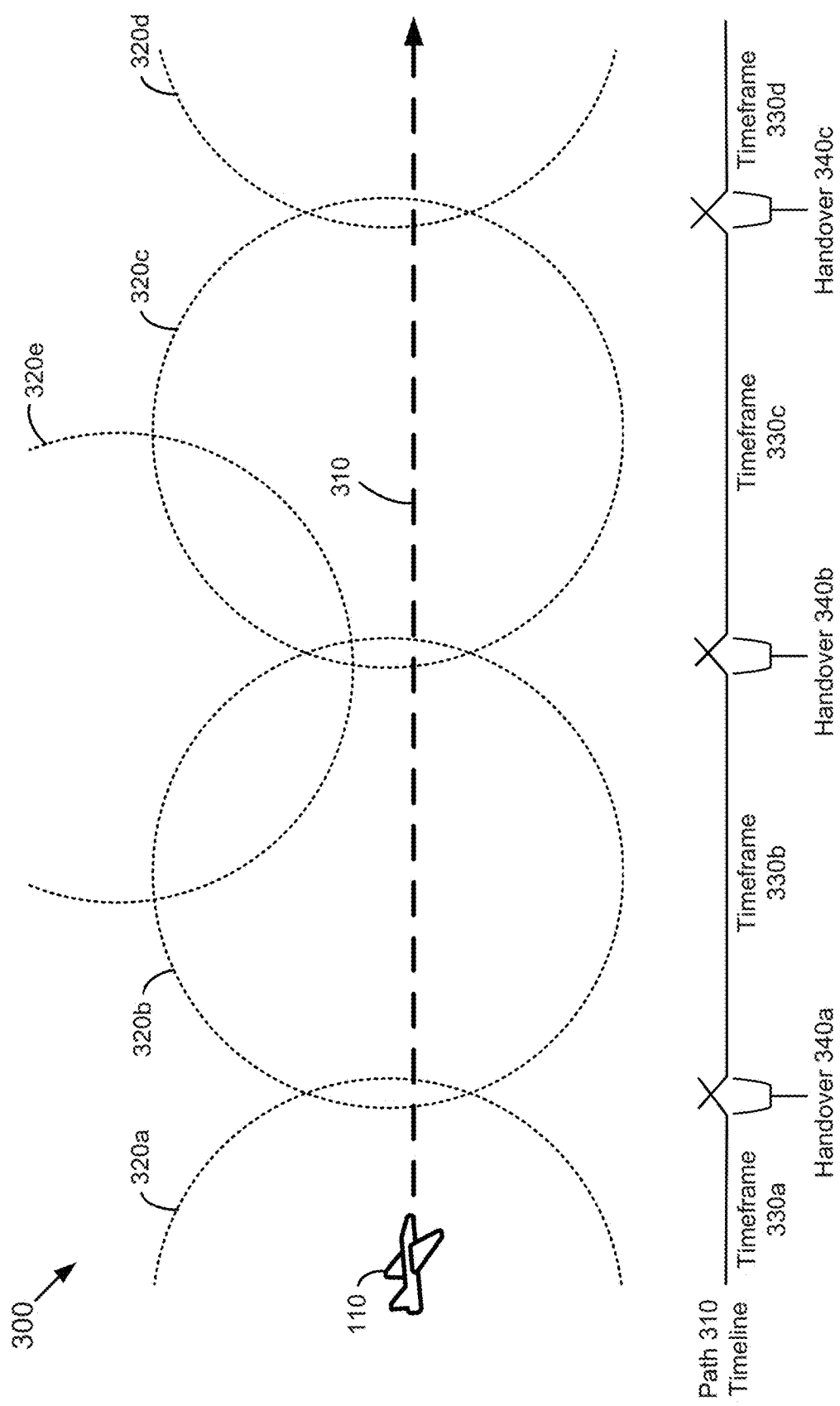
FIG. 3 shows a communication environment in which a craft may travel along paths through multiple communication coverage areas of a multi-link communication system.

FIG. 3 shows an illustrative communication environment 300 in which a craft 110 is traveling (i.e., in-transit) along a path, such as path 310, through multiple communication coverage areas 320*a-e* of different communication links of a communication system. For example, the communication system may be a multi-beam satellite communication system where one or more satellites, such as satellite 105 in FIGS. 1 and 2, having different beams servicing different geographic areas to provide the respective communication links. As another example, the communication system may be a ground-based system where one or more cell towers maintain one or more wireless communication links. As yet another example, the communication system may be a hybrid of ground and air-based communication systems.

For example, in FIG. 3, craft 110 may traverse first, second, third, and fourth communication coverage areas 320a-d (which are serviced by first, second, third, and fourth communication links, respectively) along path 310 during first, second, third, and fourth timeframes 330a-d. Each time craft 110 moves from one communication coverage area to another communication coverage area, craft 110 is "handed over" to a new communication link in the new communication coverage area. For example, as craft 110 moves from one communication coverage area to another, craft 110 may set up a new communication link in that new coverage area.

A handover between communication links may include handing over between communication links in the same communication network or system, or it may include handing over between different communication networks or systems. Generally, a handover between communication links in the same communications network may be faster than those between disparate networks (though this may not always be the case). Thus, the problem of maintaining streaming data during handovers between disparate communication networks may be exacerbated.

In the illustrated example of the path 310 timeline, each handover 340a-c takes place during overlapping coverage of communication coverage areas 320a-d such that there are no locations along the path 310 outside all the communication coverage areas 320a-d. Nevertheless, the handover from one communication coverage area to another takes time, and therefore the availability of streaming media may be affected during any such handover period. In addition, more generally, a handover may be between communication links having overlapping or non-overlapping coverage areas. In other words, the length of the interruption of communication service to the craft 110 during a handover may include an outage time during which the craft 110 is outside the coverage areas of both communication links.

Generally, craft 110 will begin a transition from one communication link to another communication link at an actual link transition initiation time. The actual link transition initiation time may fall during a handover period, such as handover periods 340a-c and 360a. Where a craft follows a path, such as path 310, and is aware of the extent of the communication coverage areas, such as communication coverage areas 320a-d, the path predictor may determine an expected link transition initiation time (i.e., when the craft expects to begin the link transition between one communication link and another) and an expected link transition duration (i.e., the expected time to transition from one communication link to another). The expected link transition duration may be determined using various techniques. For example, the path predictor 248 may estimate the link transition duration based on previous handovers between the current communication link and the predicted next communication link by craft 110 and/or other crafts. As another example, the path predictor 248 may estimate the link transition duration based on the type of access network(s) that provide the current communication link and the predicted next communication link.

Moving from communication link to communication link, whether between communication links having overlapping coverage areas or having non-overlapping coverage areas, interrupts communication between the craft 110 and the remote media server 180. In some embodiments, the path predictor 248 may determine whether or not to initiate utilization of the variable playback rate techniques described herein based on the length of time of the expected link transition duration. For example, the path predictor 248 may compare the length of time of the expected link transition duration to a threshold, and only send information about an upcoming transition to the playback rate controller 238 if the expected link transition duration exceeds a threshold. In some embodiments, the path predictor 248 may only send information about an upcoming transition to the playback rate controller if the transition is between communication links of different communication access networks. The link transition duration between communication links of the same communication access network may be significantly shorter than between communication links of difference communication access networks, such that the first buffer size of the local media buffer is sufficient for providing uninterrupted streaming during the handover between communication links of the same communication access network. For example, the expected link transition duration between communication links of the same communication access network (e.g., different beams of the same satellite) may merely involve having the two-way communication system acquire the signal of the new communication link, whereas handover between different communication access networks (e.g., different satellite networks) may involve repointing an antenna of the two-way communication system, acquiring the signal on the new communication link, and login and authentication (e.g., assignment of scheduled access) of the craft within the new communication access network.

Figure 4A:
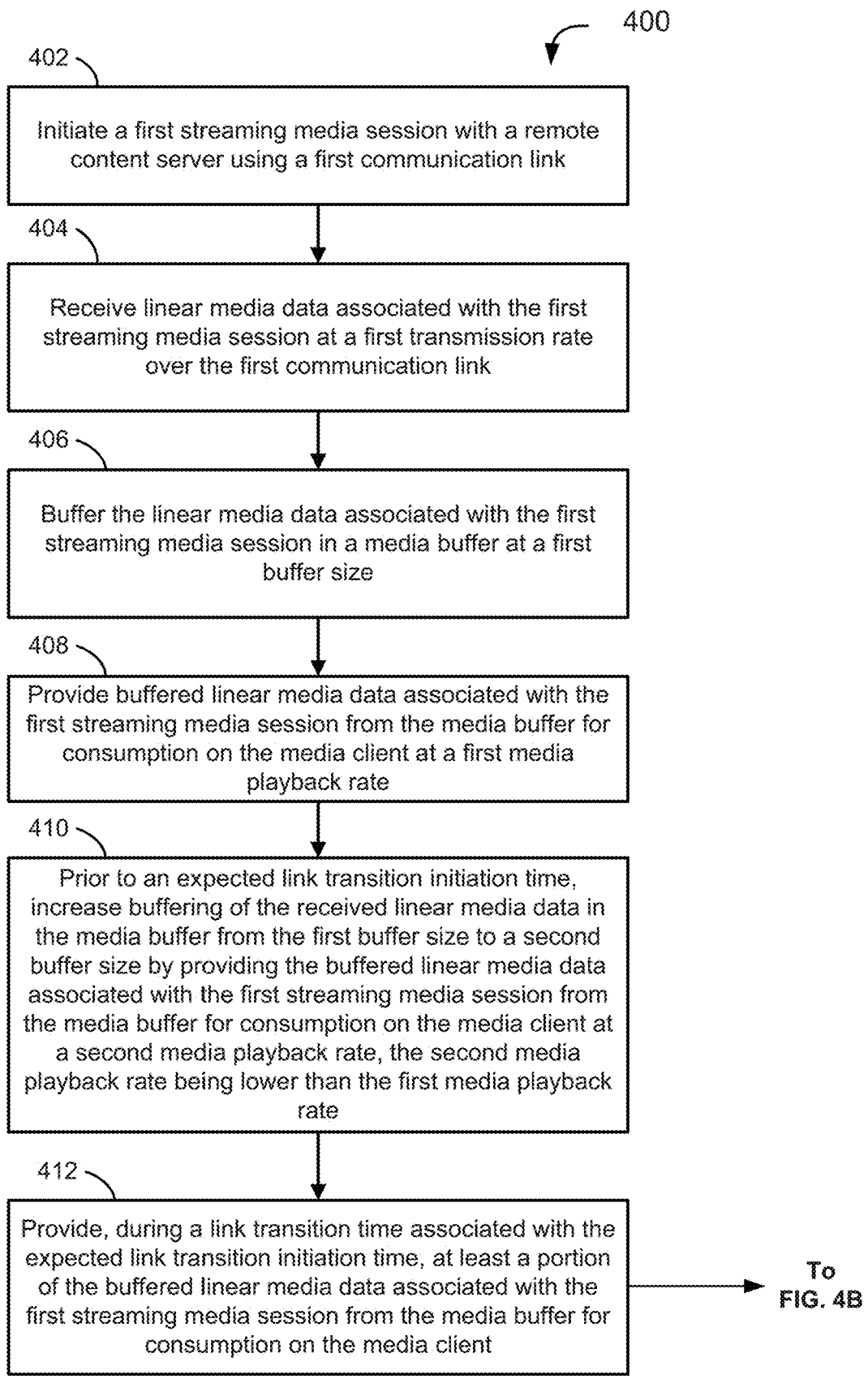
FIGS. 4A and 4B show aspects of a method for providing uninterrupted streaming media to media clients in a craft during communication system handover events.

FIG. 4A shows an embodiment of a method of providing uninterrupted streaming media to media clients in a craft during communication system handover events.

In step 402, a first streaming media session is initiated with a remote content server using a first communication link. For example, communication controller 232 of media playback system 130 on craft 110 may initiate a first streaming media session with a remote content server 180 via a satellite communication system in response to a request from a media client 120 on craft 110, such as that depicted in FIGS. 1 and 2.

In step 404, linear media data associated with the first streaming media session is received at a first transmission rate over the first communication link. For example, linear media data such as a live TV broadcast of a sporting event may be received over a first satellite communication link as depicted in FIG. 2.

In step 406, linear media data associated with the first streaming media session is buffered in a local media buffer at a first buffer size. For example, the linear media data may be buffered in local media buffer 236 via local media buffer controller 234 as depicted in FIG. 2. The buffer size may refer to a variety of aspects of the buffer. For example, the buffer size may be expressed in time units of buffered media data, such as 1 minute of buffered media data. Alternatively, the buffer size may be expressed in size units of buffered media data, such as 100 megabytes of buffered media data. As yet another alternative, the buffer size may be expressed in video frame units, such as 600 frames. Other means of expressing the buffer size may also be used.

Notably, buffer size may be a logical construct, and does not necessarily refer to a physical memory of an exact capacity. Rather, buffer size may be determined by, for example, the media playback system and may be changed based on system needs. By way of example, a memory of an arbitrary size may have some portion of that memory, whether measured in size units (e.g., megabytes) or in equivalent time units, allocated to a media buffer, which may thus be called a media buffer of a first size. The allocation may subsequently be changed to address system needs such that the buffer is of a second size, where the second size may be greater than or less than the first size depending on the system needs.

In step 408, buffered linear media data associated with the first streaming media session is provided from the local media buffer for consumption on a media client at a first media playback rate. For example, the buffered linear media data may be provided from local media buffer 236 via playback rate controller 238 of media playback system 130 to a media client 120, as depicted in FIG. 2.

The media playback rate may be based on, for example, a frame rate (e.g., 60 frames per second). Other media playback rates may alternatively be used. In some embodiments, the media playback rate will be related to the transmission rate of the media to the craft from the remote content server. For example, linear media data may be provided to the media playback system from the remote content server at 60 frames per second, buffered, and then provided to the media clients at substantially the same rate of 60 frames per second. In this way, the buffer size (after being initially established) will be constant.

In step 410, prior to an expected link transition initiation time, buffering of the received linear media data in the media buffer is increased from the first buffer size to a second buffer size by providing the buffered linear media data associated with the first streaming media session from the media buffer for consumption on the media client at a second media playback rate, the second media playback rate being lower than the first media playback rate. The expected link transition initiation time may be determined using the techniques described above by the path predictor 248, as depicted in FIG. 2.

For example, playback rate controller 238 may reduce the media playback rate of the linear media data provided to the media client 120. Generally speaking, a particular media playback rate that is lower than another media playback rate means that less information is consumed per unit time. For example, a media playback rate of 50 FPS is a lower playback rate than a media playback rate of 60 FPS. Because the transmission rate of linear media data from the remote content server 180 to local media sever 130 has not changed while the playback rate has been reduced, the amount of media information buffered in local media buffer will grow in size.

In some embodiments, the second media playback rate may be, for example, less than or approximately equal to 10% lower than the first media playback rate. Specifically, the second media playback rate may be approximately 1% lower, 2% lower, 3% lower, 4% lower, 5% lower, 6% lower, 7% lower, 8% lower, 9% lower, or 10% lower than the first media playback rate. In other embodiments, the second media playback rate may be 10%-15% lower than the first media playback rate. For example, if the second media playback rate is 10% lower than the first media playback rate, and the first media playback rate is 60 frames per second, then the second media playback rate would be approximately 54 frames per second.

The second media playback rate may be determined by the playback rate controller 238, for example, based on the expected link transition duration and the amount of time until the expected link transition initiation time. In other words, the second media playback rate may be determined such that the buffer size of the local media buffer on the craft will grow sufficiently large to be able to provide uninterrupted streaming media during an expected link transition duration, which may include a communication link outage. In some embodiments, the second media playback rate is no more than 10% lower than the first media playback rate in order to prevent a media consumer from noticing a difference in the playback rate. For example, characteristics of both the sound and video may be noticeably affected if the second media playback rate is too significantly different as compared to the first media playback rate.

In some embodiments, the second media playback rate can be limited (e.g. to no more than 10% less than the first media playback rate) by initiating the playback of the media content at the second media playback rate sooner in order to allow the media buffer to grow larger relative to its normal size. For example, where the expected link transition duration is one minute, and the first media playback rate is 60 frames per second and the second media playback rate is no lower than 54 frames per second, the second playback rate may be initiated at least ten minutes in advance of the expected link transition initiation time.

For example, the time required to build the buffer to a sufficient size to last during an expected link transition duration, which may also be referred to as the set-back time $t_s$ may be calculated based on the expected link transition duration $t_x$ (e.g., in seconds), the first media playback rate (e.g., in frames per second) $r_1$, and the second media playback rate $r_2$ (e.g., in frames per second) according to the following equation:

$$t_s \geq \frac{t_d}{\frac{r_1}{r_2} - 1}$$

Further, the actual time $t_a$ to start the decreased playback rate may be calculated based on the setback time $t_s$ and the expected link transition initiation time $t_i$ according to the following equation:

$$t_a = t_i - t_s$$

Using, for example, the equations above, the second media playback rate may be configured so that the media buffer will not be depleted during an expected link transition.

For example, given an expected link transition duration td of 60 seconds, a first media playback rate $r_1$ of 60 FPS, and a second media playback rate $r_2$ of 54 FPS, the setback time $t_s$ may be calculated as follows:

$$t_s \geq \frac{60}{\frac{60}{54} - 1} \rightarrow t_s \geq 540 \text{ seconds}$$

And the time to start the decreased playback rate given an expected link transition initiation time $t_i$ of 12:00 may be calculated as follows:

$$t_a = t_i - t_s \rightarrow t_a = 12:00 - 540 \text{ seconds} \rightarrow t_a = 11:51$$

Notably, using the aforementioned equations would allow the media buffer to fill to sufficient size so that the first playback rate could be resumed before the link transition initiation time $t_i$. However, the first playback rate need not be resumed before the link transition initiation time $t_i$ in all embodiments. In some embodiments, it may be preferable to maintain the second playback rate through the link transition time as an additional buffer against any unexpected delays in link transition.

Further, the equations above are just one example. The media playback rate may also be configured, for example, using fixed set-back times based on expected link transition durations (e.g., 10 minutes of setback for every 1 minute of expected link transition duration). Other methods may alternatively be utilized. Additionally, the variables of the aforementioned equation may be rearranged to determine for example the second playback rate instead of the required start time where the required start time is known instead.

In step 412, during a link transition time associated with the expected link transition initiation time, at least a portion of the buffered linear media data associated with the first streaming media session is provided from the media buffer for consumption on the media client. In some embodiments, the playback rate during the link transition time may remain (or return) to the second playback rate in order to maximize the amount of time uninterrupted streaming to the requesting media device, in order to allow for unexpected delays in the link transition duration. The link transition time is the time during which the craft is handing over from the first communication link to a second communication link, such that communication service to the craft is temporarily interrupted. Thus, during this time the size of the local media buffer will decrease, as buffered linear media data is provided to a requesting media client but no additional linear media data is being added to the local media buffer. As a result, the size of the media buffer during the link transition time will be reduced from the second buffer size to a third buffer size. The beginning of the link transition time may be different than the expected link transition initiation time determined by the path predictor, due to differences between the predicted path of the craft and the actual path of the craft.

Figure 4B:
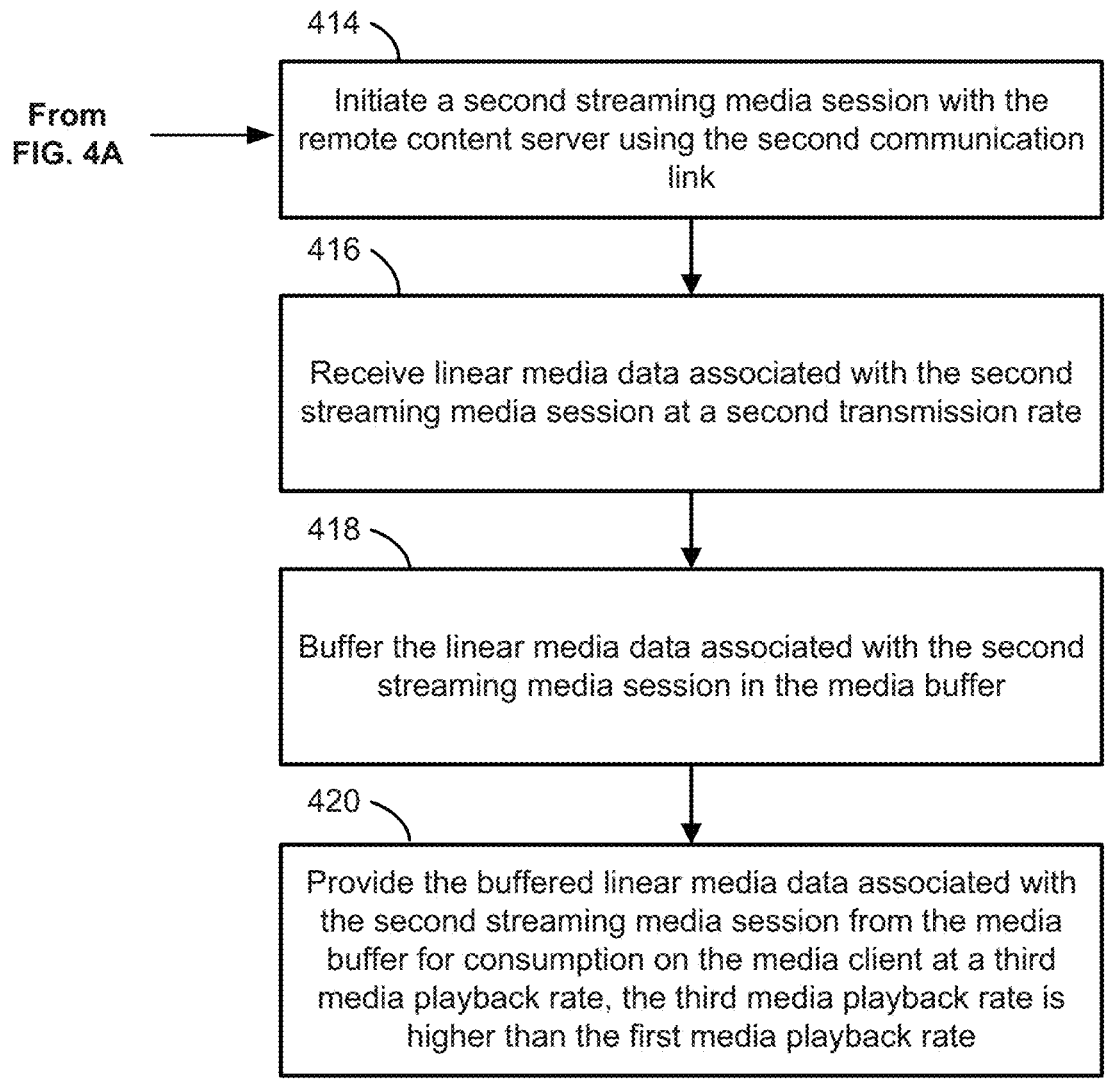

FIG. 4B depicts further aspects of a method of providing uninterrupted streaming media to media clients during communication system handover events.

In step 414, a second streaming media session is initiated with the remote content server using the second communication link. The second communication link may be, for example a second satellite communication link, an air-to-ground communication link, or any other type of communication link as described above. Notably, here the second streaming media session refers to the fact that a new communication link is being set up in order to transport the same streaming media to the media client. Consequently, from a user's perspective, the stream of media played on the media client is uninterrupted even when the second streaming media session is commenced. Although referred to herein as a second streaming media session for clarity purposes, in some embodiments the second streaming media session and the first streaming media session may both be part of the same streaming media session between the remote content server and a requesting media client. In other words, the streaming media session may be paused during the link transition time, and then resumed upon establishment of the second communication link. In some other embodiments, the first and second streaming sessions are separate streaming media sessions with the remote media server. In such a case, the first streaming media session may be terminated during the link transition time, and the second streaming media session may be setup upon establishment of the second communication link.

In step 416, linear media data associated with the second streaming media session is received at a second transmission rate. The second transmission rate may be the same or different as compared to the first transmission rate. In some embodiments, the second transmission rate is higher that the first transmission rate of step 404 to provide content that was missed during the handover. Upon reception of the missed content, the second transmission rate may be lowered to the first transmission rate.

In step 418, the linear media data associated with the second streaming media session is buffered in the media buffer.

In step 420, buffered linear media data associated with the second streaming media session is provided from the media buffer for consumption on the media client at a third media playback rate, the third media playback rate being higher than the first media playback rate. As a result of the reduced media playback rate and increased buffering, the streaming media data will lag the real-time stream of the media data more than during normal buffering. In other words, the media data provided to the media clients for consumption will be farther behind the real-time media content by virtue of the reduced media playback rate and increased buffering. In order to bring the media data provided to the media clients closer to the real-time media stream, in embodiments in which the second transmission rate of step 416 is temporarily higher that the first transmission rate of step 404 to provide content that was missed during the handover, the playback rate may be subsequently increased in order to "catch up" with the real-time media stream. This may be desirable, for example, where the real-time media stream is a sporting event and any induced lag due to increased buffering and decreased playback rate during handovers may create the potential for an outcome of the sporting event to be obtained by a user (e.g., via some other data messaging means) before the buffered media stream played on the media client reaches that outcome. In some embodiments, prior to step 420, the playback rate may be another playback rate that is lower than the third playback rate (e.g., the first playback rate, the second playback rate, or a different playback rate) for a period of time. In yet other embodiments, the media playback rate at step 420 is the first playback rate, such that playback does not "catch-up" with the real-time media stream.

Figure 5:
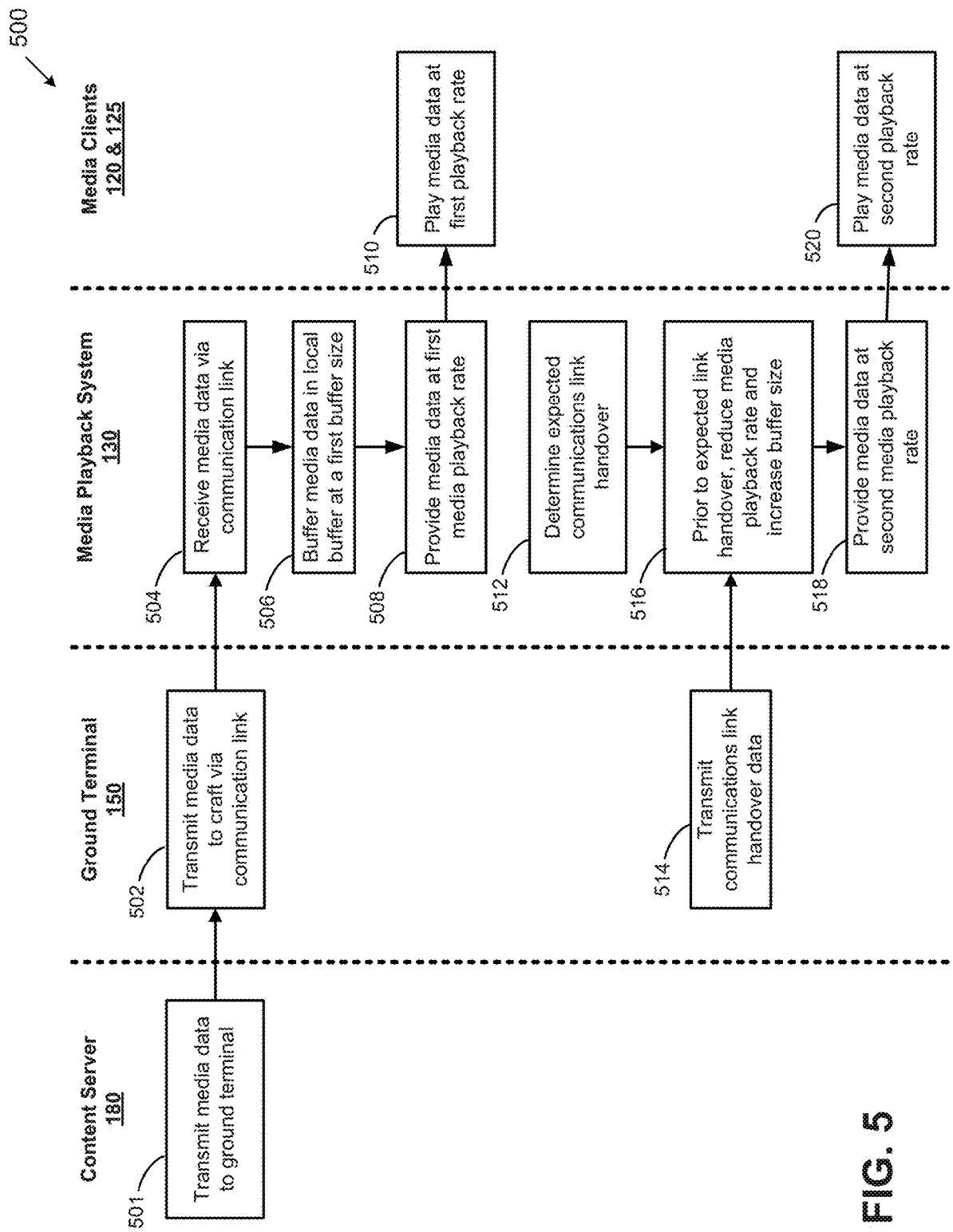
FIG. 5 shows a flow diagram of aspects of a system for providing uninterrupted streaming media to media clients in a craft during communication system handover events.

FIG. 5 shows a flow diagram 500 of aspects of a system for providing uninterrupted streaming media to media clients in a craft during communication system handover events.

At step 501, remote content server 180 transmits media data to a ground terminal 150. For example, remote content server 180 may transmit media data in response to an initiation of a streaming media session by the craft, such as a message sent from the craft to remote content server 180 via the communication link requesting access to media stored at remote content server 180. In other embodiments, remote content server 180 may initiate the transmission of media to the craft instead. For example, remote content server 180 may initiate the transmission when a scheduled event begins, such as a scheduled television program or a scheduled sporting event, or the like.

At step 502, ground terminal 150 transmits the media data to a craft, such as craft 110 in FIG. 1, via a communication link, At step 504, media playback system 130 receives the media data via the communication link. As discussed above, in some embodiments the communication link may be a satellite communication link. In such cases, the media playback system may receive the media data via, for example, a communication link in the satellite communication system.

At step 506, media playback system 130 buffers the received media data in a local buffer at a first buffer size. For example, the first size may be a buffer of 10 minutes of media data.

At step 508, media playback system 130 provides media data to media clients 120 at a first media playback rate. As discussed above, the first media playback rate may be substantially similar to the transmission rate from remote content server 180 to media playback system 130 when the media data is linear media data. Additionally, the first media playback rate may be equal to a nominal or original playback rate intended for the media data. For example, television media data may be nominally broadcast at 60 frames per second.

At step 510, one or more local media client (e.g., media clients 120 in FIG. 1) play the media data at the first playback rate.

Steps 502-510 represent a traditional method of delivering streaming media data to a craft. During a communication link handover, however, media playback system 130 may stop receiving media data via the communication link and subsequently its buffer may run out of data, thereby interrupting service to media clients 120. Aspects of the present disclosure resolve this issue as follows.

At step 512, media playback system 130 determines an expected communication link handover. As described above, media playback system 130 may determine an expected communication link transition time based on the craft's movements and known communication coverage areas. For example, media playback system 130 may determine that an expected link transition between a first communication link and a second communication link (e.g., between two different satellite communication networks or between two different spot beams associated with the same satellite communication network) will occur in twenty minutes based on the craft's current speed and heading. Remote content server 180 may subsequently transmit communication link handover data (e.g., expected link transition initiation time and duration of the handover and connection details related to the new communication link) to the craft, for example to media playback system 130.

In an alternative embodiment, a ground-based system, such as ground terminal 150, may determine an expected communication link handover. For example, ground terminal 150 may determine an expected communication link transition time based on the craft's movements and known communication coverage areas. In some embodiments, ground terminal 150 may provide craft 110 with communication coverage area data before or during transit so that media playback system 130 may make determinations of expected communication link handovers autonomously. This may be useful, for example, when the craft is expected to be outside of a communication coverage area for a significant period of time and reacquisition of a communication link is difficult to determine.

At step 516, prior to an expected communication link transition, media playback system 130 may reduce the media playback rate in order to increase the buffer size from a first buffer size to a second buffer size. For example, the buffer size may be increased from 1 minute (first buffer size) to 5 minutes (second buffer size). As another example, the buffer size may be increased from 100 MB (first buffer size) to 500 MB second buffer size). In some embodiments, media playback system 130 includes a playback rate controller such as playback rate controller 238 in FIG. 2. The playback rate controller may be configured, for example, to determine first and second media playback rates. In particular, the playback rate controller may be configured to determine a second media playback rate based on characteristics of a communication link transition, such as expected link transition initiation time and an expected link transition duration.

At step 518, media playback system 130 provides media data at a second media playback rate to media clients 120. For example, the second media playback rate may be lower than the first media playback rate in order to facilitate increasing a local media buffer size from a first size to a second size. As discussed above, in some embodiments, media playback system 130 may continue to provide media data at the second media playback rate after the communication link handover is complete while in other embodiments media playback system 130 may instead return to the first media playback rate once the buffer is sufficiently filled to cover the expected link transition.

At step 520, local media clients 120 play the media data at the second media playback rate. As described above, the range of adjustment of the second media playback rate may be limited in order to maintain a certain quality of the media consuming experience (e.g., in order to prevent the distortion of sound and/or video aspects of the media data).

Figure 6:
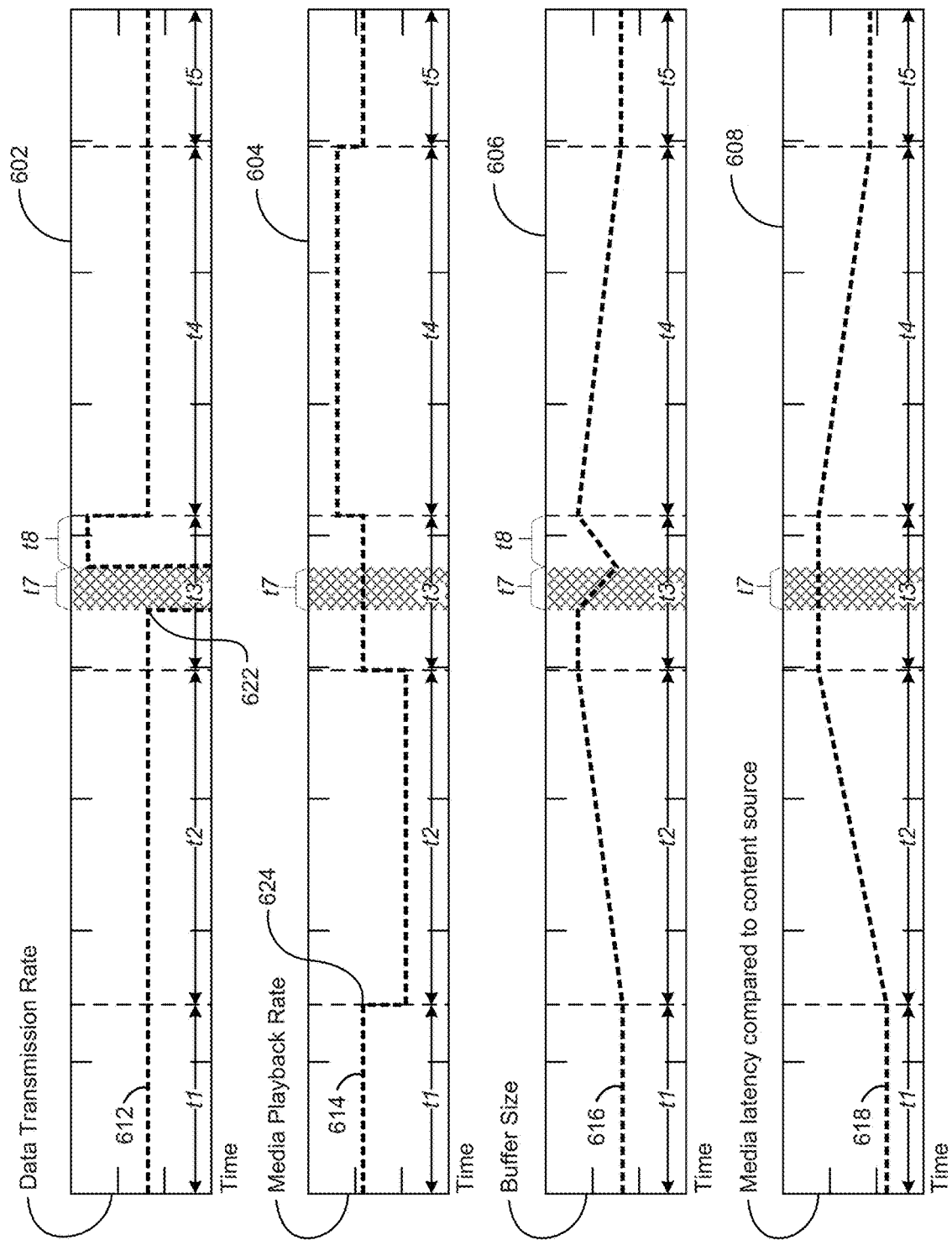
FIG. 6 depicts various system performance aspects of a system for providing uninterrupted streaming media to media clients in a craft during communication system handover events.

FIG. 6 depicts various system performance aspects of a system for providing uninterrupted streaming media to media clients in a craft during communication system handover events.

Graph 602 plots data transmission rate 612 from a remote content server, such as remote content server 180 in FIG. 1, to a media playback system on a craft, such as media playback system 130 on craft 110 in FIG. 1, against time. Graph 602 also indicates time intervals t1, t2, t3, t4, t5, t6, t7, and t8, which are similarly indicated in graphs 604, 606, and 608.

Time 622 indicates the link transition initiation time that begins time interval t7, where interval t7 indicates the duration of the communication link handover. For example, t7 may indicate the time necessary to transition from the communication link associated with communication coverage area 320a to the communication link associated with communication coverage area 320b in FIG. 3. During the handover at time interval t7, the data transmission rate 612 from the remote content server to the media playback system goes to zero. Once a new communication link is established after t7, the data transmission rate 612 becomes non-zero once again. After a new communication link is established in t7, the data transmission rate 612 may be temporarily increased as shown during time interval t8. The data transmission rate 612 may be increased, for example, to provide content to the craft that was missed during the handover interval t7. In some embodiments, the increased data transmission rate 612 during time interval t8 may be accomplished via a unicast data stream to the craft. In other embodiments, the data transmission rate 612 before and after t7 may instead be similar or equivalent to before the handover, and in yet other embodiments the data transmission rate 612 may be lower after the handover. For example, when transitioning from a relatively high-speed communication link, such as a satellite communication link, to a relatively slower communication link, such as an air-to-ground communication link, the data transmission rate 612 after time interval t7 may be lower than before.

Graph 604 plots media playback rate 614 against time. In this example, the media playback rate during time interval t1 may be referred to as a first media playback rate. As explained above, when the media being played back is linear media data, the media playback rate 614 may be equivalent to the rate at which the media playback system receives data from the remote content server via the communication link.

Time 624 represents the time at which the first media playback rate is reduced to a second media playback rate in order to increase the buffer size and in preparation for the link transition time 622. Time 624 may be referred to as the setback time. In some embodiments, the setback time is equal to or greater than the time before the handover event necessary to ensure the local media buffer is not exhausted during the handover event (during time interval t7).

During time interval t2 in graph 604, media playback rate 614 is reduced and as a result the buffer size grows during this period from a first buffer size during time interval t1 to a peak buffer size at the start of time interval t3 (as shown in graph 606).

During time interval t3 in graph 604, media playback rate 614 returns to the first playback rate (i.e., the playback rate during time interval t1). In this example, the media playback rate 614 returns to the first playback rate before time interval t7 begins because the system is providing for additional buffering of media data above what is necessary to get through the handover during time interval t7. In other examples, the media playback rate 614 may not allow for such margin. Notably, despite the handover event t7 during time interval t3, the media playback is not interrupted. Thus, despite moving from a first communication link to a second communication link during handover event t7, the media delivery system continues to provide media data to media clients as normal and the user's experience is improved.

In other embodiments, media playback rate 614 may be reduced again during t7 to provide additional margin during the handover. In other words, by reducing the media playback rate 614 during the handover, the buffer will be drawn down more slowly as compared to the first media playback rate, thereby providing more time for the handover to complete without interruption. For example, media playback rate 614 may be dropped back to the second media playback rate during the handover (time interval t7). Alternatively, media playback rate 614 may be reduced to another playback rate, different from either of the aforementioned first and second media playback rates.

During time interval t4 of graph 604, media playback rate 614 is increased to a third playback rate that is higher than the first playback rate. While not necessary in all embodiments, this step serves to reduce buffer size 616 of the local media buffer (as shown in graph 606) and to reduce the latency 618 of the buffered media as compared with the content source (as shown in graph 608). As explained above, it may be desirable to reduce latency of linear media content to avoid adverse user experiences, such as finding out the result of a sporting event before seeing the result on the media client.

During time interval t5 of graph 604, media playback rate 614 returns to the first media playback rate, which may be referred to as a default or initial media playback rate. Because the first media playback rate in this example is equivalent to the rate at which the media playback system receives the media from the remote content server, both the buffer size 616 and the media latency 618 remain static during time interval t5.

Graph 606 plots buffer size 616 against time. In this example, buffer size 616 during time interval t1 may be referred to as a first buffer size, or alternatively a default or initial buffer size.

During time interval t2 in graph 606, buffer size 616 is increased as a result of the playback rate 614 being reduced (as shown in graph 604).

During time interval t3 in graph 606, buffer size 616 starts at a second size until the handover event at t7. During the handover event (time interval t7), the buffer size is reduced because the media playback system is no longer receiving media data from the remote content server. After the handover event concludes and the craft resumes data communications with the remote content server via a second communication link, the buffer size begins to increase during time interval t8 because, as described above, the data transmission rate 612 is increased during t8.

During time interval t4 of graph 606, buffer size 616 is reduced due to the playback rate 614 being increased to a third playback rate, higher than the first playback rate. As explained above, this step is not necessary in all embodiments. This step primarily serves the purpose of reducing the latency 618 of the buffered media data as compared to the content source.

During time interval t5 of graph 606, buffer size 616 stabilizes as the media playback rate 614 is returned to the first media playback rate. Note that in the time interval t5 of this embodiment, the buffer size is lower than the initial buffer size during t1 due to the "catch-up" media playback rate 604 during time interval t4. In some embodiments, it may be desirable to once again lower the media playback rate 614, though perhaps less significantly, in order to increase buffer size 616.

Graph 608 plots media latency 618 relative to the content source against time. In this example, media latency 618 during time interval t1 may be referred to as a first latency.

During time interval t2 in graph 608, media latency 618 is increased as a result of the playback rate 614 being reduced (as shown in graph 604).

During time interval t3 in graph 608, media latency 618 stabilizes at a second media latency because the playback rate 614 has returned to the first playback rate (as shown in graph 604).

During time interval t4 of graph 608, media latency 618 is reduced due to the playback rate 614 being increased to a third playback rate, higher than the first playback rate. As explained above, this step is not necessary in all embodiments.

During time interval t5 of graph 608, media latency 618 returns to the first latency.

The examples described with respect to graphs 602, 604, 606 and 608 in FIG. 6 are not limiting. Many different strategies may be employed with respect to the data transmission rate and media playback rate in order to manipulate the buffer size and latency and to improve user experience. In particular, not all steps described above need to be implemented. For example, the catch-up media playback rate may not be implemented.

Figure 7:
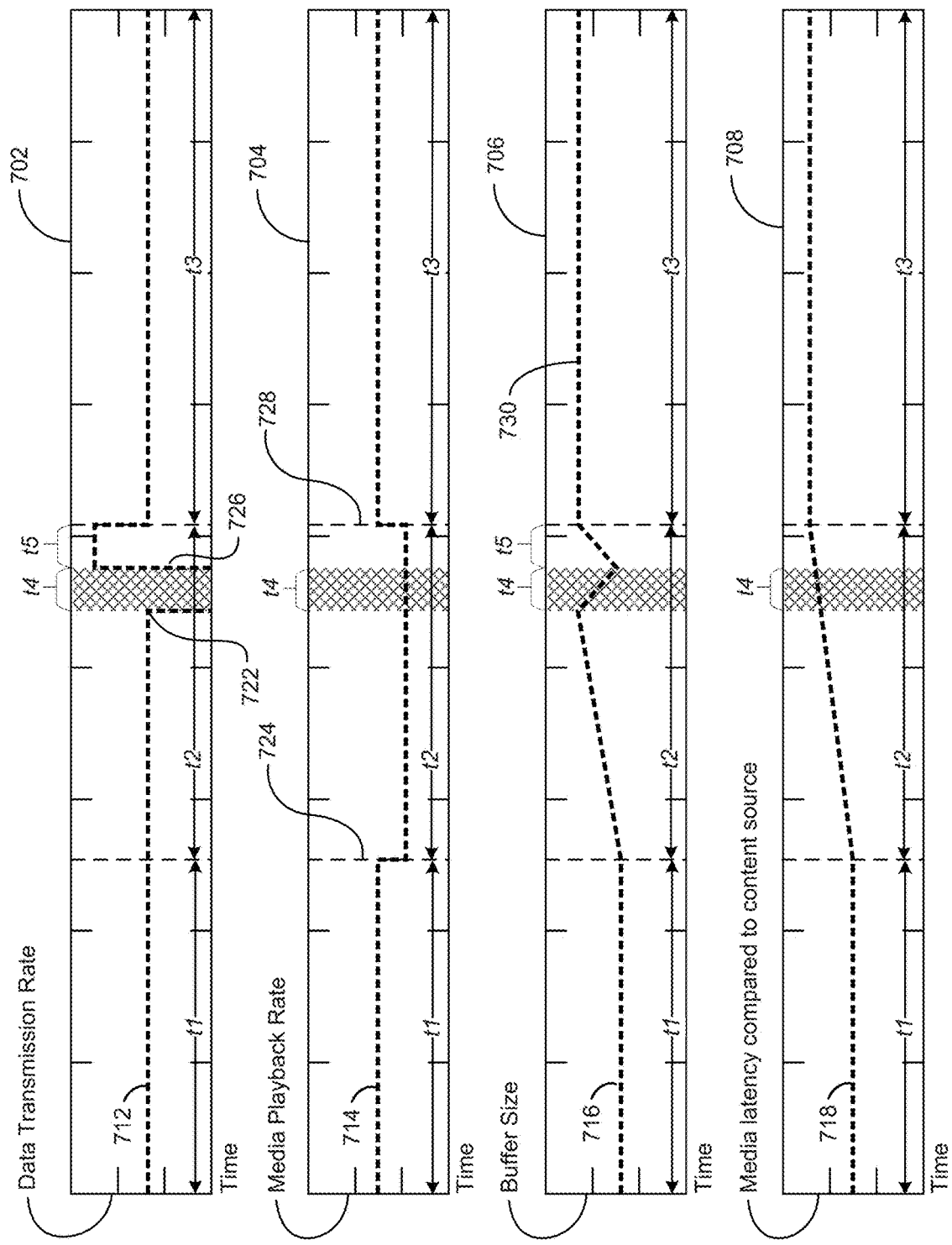
FIG. 7 depicts various system performance aspects of a system for providing uninterrupted streaming media to media clients in a craft during communication system handover events.

FIG. 7 depicts various system performance aspects of a system for providing uninterrupted streaming media to media clients in a craft during communication system handover events. In particular, FIG. 7 depicts an alternative embodiment for a media playback rate strategy as compared to FIG. 6.

Graph 702 plots data transmission rate 712 from a remote content server, such as remote content server 180 in FIG. 1, to a media playback system, such as media playback system 130 on craft 110 in FIG. 1, against time. Graph 702 also indicates time intervals t1, t2, t3, and t4, which are similarly indicated in graphs 704, 706, and 708.

Similar to FIG. 6, time 722 indicates the link transition initiation time that begins time interval t4, and interval t4 indicates the duration of a communication link handover. For example, t4 may indicate the time necessary to transition from one satellite communication network to another satellite communication network. During the handover interval t4, the data transmission rate 712 from the remote content server to the media playback system goes to zero. Once a new communication link is established after t4, the data transmission rate 712 becomes non-zero once again. As above, after a new communication link is established in t4, the data transmission rate 712 may be temporarily increased as shown during time interval t5. The data transmission rate 712 may be increased, for example, to provide content to the craft that was missed during the handover interval t4. In some embodiments, the increased data transmission rate 712 during time interval t5 may be accomplished via a unicast data stream to the craft. After the increased data transmission rate 712 in t5, the data transmission rate 712 may return to a rate similar to or equivalent to that before the handover, as shown in t3 of FIG. 7. However, as above, while the data transmission rate 712 before t4 and after t5 is shown as equivalent in this example, it need not be.

Graph 704 plots media playback rate 714 against time. In this example, the media playback rate during time interval t1 may be referred to as a first media playback rate. As explained above, when the media being played back is linear media data, the media playback rate 714 may be equivalent to the rate at which the media playback system receives data from the remote content server via the communication link.

Time 724 represents the time at which the first media playback rate is reduced to a second media playback rate in order to increase the buffer size and in preparation for the link transition time 722. Time 724 may be referred to as the setback time. In some embodiments, the setback time is equal to or greater than the time before the handover event necessary to ensure the local media buffer is not exhausted during the handover event (during time interval t4).

During time interval t2 in graph 704, media playback rate 714 is reduced to a second media playback rate and, as a result, the buffer size grows during this period from a first buffer size during time interval t1 to a second buffer size during a portion of time interval t2 (as shown in graph 706).

During time interval t3 in graph 704, media playback rate 714 returns to the first playback rate (i.e., the playback rate during time interval t1). In this example, the media playback rate 714 returns to the first playback rate at time 728, which is after the handover (t4), in order to reduce the rate of buffer drawdown during the handover (t4). Thus, leaving the media playback rate 712 at a reduced rate during t3 provides for additional margin during the duration of the handover (t4). Further, leaving the media playback rate 712 at a reduced rate during t2 additionally helps to restore the size of the buffer pre-handover (e.g., during t1).

Graph 706 plots buffer size 716 against time. In this example, buffer size 716 during time interval t1 may be referred to as a first buffer size, or alternatively a default or initial buffer size.

During time interval t2 in graph 706, buffer size 716 initially increases as a result of the playback rate 714 being reduced (as shown in graph 704). Buffer size 716 ultimately reaches a peak before link transition initiation time 722. At link transition initiation time 722, the buffer size 716 begins decreasing as a result of the data transmission rate 712 going to zero, as shown in graph 702. After the handover (during time interval t4), during time interval t5, the buffer size 716 starts increasing again because data transmission 712 has been restored, but the media playback rate 714 remains reduced. Thus, by the beginning of t3 at time 728, the buffer size 716 is either fully or substantially restored to the first buffer size during t1. However, in other embodiments the buffer size 716 may be increased during t5, but still end up lower than before the handover during time interval t4.

Graph 708 plots media latency 718 relative to the content source against time. As shown in graph 708, and similar to the description with respect to FIG. 6 above, the media latency is affected by the media playback rate. For example, during time interval t2, the media latency 718 increases due to the media playback rate 714 being decreased in the same interval. Then, during t3, the media latency 718 stabilizes as the media playback rate 714 returns to the first media playback rate.

The examples described with respect to graphs 602, 604, 606, 608, 702, 704, 706 and 708 in FIGS. 6 and 7 are not limiting. Many different strategies may be employed with respect to the data transmission rate and media playback rate in order to manipulate the buffer size and latency and to improve user experience. In particular, not all steps described above need to be implemented. For example, the catch-up media playback rate may not be implemented. Further, while different rates such as the media playback rate and transmission are generally depicted as moving from one rate directly to another rate, other embodiments may include ramping of rates up or down between different target rates. For example, rather than transitioning directly from a first media playback rate to a second media playback rate, the playback rate may be ramped from one rate to another over a set period of time in order to, for example, smooth out the transition.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In the present disclosure, certain terminology is used in the following ways. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors. The term "substantially" means that the recited characteristic, parameter, or value need not be achieved exactly, but that deviations or variations including, for example, tolerances, measurement error, measurement accuracy limitations and other factors, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for providing media content to a media client on a craft, comprising:
   by a media playback system of the craft:
      initiating a first streaming media session with a remote content server using a first communication link;
      receiving, from the remote content server, linear media data associated with the first streaming media session at a first transmission rate over the first communication link;
      buffering the linear media data associated with the first streaming media session in a media buffer at a first buffer size;
      providing a first portion of the buffered linear media data associated with the first streaming media session from the media buffer for consumption on the media client at a first frame rate;
      predicting an expected link transition initiation time based at least in part on the craft's heading and speed;
      determining an expected link transition duration between the first communication link and a second communication link;
      prior to the expected link transition initiation time, determining to increase buffering of the received linear media data in the media buffer from the first buffer size to a second buffer size if the expected link transition duration exceeds a threshold, by providing a second portion of the buffered linear media data associated with the first streaming media session from the media buffer for consumption on the media client at a second frame rate, the second frame rate being lower than the first frame rate; and providing, during a link transition time associated with the expected link transition initiation time, a third portion of the buffered linear media data associated with the first streaming media session from the media buffer for consumption on the media client.

2. The method of claim 1, further comprising:
after the link transition time, initiating a second streaming media session with the remote content server using the second communication link;
receiving, from the remote content server, linear media data associated with the second streaming media session at a second transmission rate;
buffering the linear media data associated with the second streaming media session in the media buffer; and
providing a portion of the buffered linear media data associated with the second streaming media session from the media buffer for consumption on the media client at the first frame rate.

3. The method of claim 1, wherein the second frame rate is less than or equal to 10% lower than the first frame rate.

4. The method of claim 2, further comprising: prior to providing the buffered linear media data associated with the second streaming media session from the media buffer for consumption on the media client at the first frame rate, providing the buffered linear media data associated with the second streaming media session from the media buffer for consumption on the media client at a third frame rate, wherein the third frame rate is higher than the first frame rate.

5. The method of claim 1, wherein the second frame rate is such that that the media buffer will not be depleted during the link transition time.

6. The method of claim 2, wherein at least one of the first communication link and the second communication link is a satellite communication link.

7. The method of claim 2, wherein the first communication link and the second communication link are satellite communication links.

8. The method of claim 2, wherein one of the first communication link and the second communication link is an air-to-ground communication link.

9. The method of claim 1, further comprising:
determining an expected link transition duration between the first communication link and a second communication link; and
determining the second frame rate based on the expected link transition initiation time and the expected link transition duration.

10. The method of claim 1, wherein predicting the expected link transition initiation time comprises:
obtaining a position of the craft;
obtaining coverage areas of a plurality of communication links; and
determining the expected link transition initiation time based on the position of the craft relative to the coverage areas.

11. The method of claim 1, further comprising determining to increase the buffering of the received linear media data if the expected link transition initiation time corresponds to a transition between different communication access networks.

12. The method of claim 11, wherein the transition between different communication access networks includes repointing an antenna.

13. The method of claim 11, wherein the different communication access networks are different satellite networks.

14. A media playback system of a craft, comprising:
a memory comprising computer-executable code;
a media buffer;
a transceiver;
at least one processor in data communication with the media buffer, the transceiver, and the memory, and configured to execute the computer-executable code and cause the media playback system to:
initiate a first streaming media session with a remote content server via the transceiver using a first communication link;
receive, from the remote content server via the transceiver, linear media data associated with the first streaming media session at a first transmission rate over the first communication link;
buffer the linear media data associated with the first streaming media session in the media buffer at a first buffer size;
provide a first portion of the buffered linear media data associated with the first streaming media session from the media buffer for consumption on a media client at a first frame rate;
predict an expected link transition initiation time based at least in part on the craft's heading and speed;
determine an expected link transition duration between the first communication link and a second communication link;
prior to the expected link transition initiation time, determine to increase buffering of the received linear media data in the media buffer from the first buffer size to a second buffer size if the expected link transition duration exceeds a threshold, by providing a second portion of the buffered linear media data associated with the first streaming media session from the media buffer for consumption on the media client at a second frame rate, the second frame rate being lower than the first frame rate; and
provide, during a link transition time associated with the expected link transition initiation time, a third portion of the buffered linear media data associated with the first streaming media session from the media buffer for consumption on the media client.

15. The system of claim 14, wherein the at least one processor is further configured to cause the system to:
after the link transition time, initiate a second streaming media session with the remote content server via the transceiver using the second communication link;
receive, from the remote content server via the transceiver, linear media data associated with the second streaming media session at a second transmission rate;
buffer the linear media data associated with the second streaming media session in the media buffer; and
provide a portion of the buffered linear media data associated with the second streaming media session from the media buffer for consumption on the media client at the first frame rate.

16. The system of claim 14, wherein the second frame rate is less than or equal to 10% lower than the first frame rate.

17. The system of claim 15, wherein the at least one processor is further configured to cause the system to, prior to providing the buffered linear media data associated with the second streaming media session from the media buffer for consumption on the media client at the first frame rate, provide the buffered linear media data associated with the second streaming media session from the media buffer for consumption on the media client at a third frame rate, the third frame rate is higher than the first frame rate.

18. The system of claim 14, wherein the second frame rate is configured so that the media buffer will not be depleted during the link transition time.

19. The system of claim 14, wherein the first communication link is a satellite communication link.

20. The system of claim 15, wherein at least one of the first communication link and the second communication link is an air-to-ground communication link.

21. The system of claim 14, wherein:
the increasing the buffering of the received linear media data in the media buffer is in response to the predicted expected link transition initiation time.

22. The system of claim 14, wherein the at least one processor is further configured to cause the system to:
determine an expected link transition duration between the first communication link and a second communication link; and determine the second frame rate based on the expected link transition initiation time and the expected link transition duration.

23. The system of claim 14, wherein, to predict the expected link transition initiation time, the at least one processor is further configured to cause the system to:
obtain a position of the craft;
obtain coverage areas of a plurality of communication links; and
determine the expected link transition initiation time based on the position of the craft relative to the coverage areas.

24. The system of claim 14, wherein the at least one processor is further configured to cause the system to determine to increase the buffering of the received linear media data if the expected link transition initiation time corresponds to a transition between different communication access networks.

25. The system of claim 24, wherein the transition between different communication access networks includes repointing an antenna.

26. The system of claim 25, wherein the different communication access networks are different satellite networks.

* * * * *